Nov. 11, 1941.  H. J. GERSTER  2,261,991
ERASING DEVICE
Filed Aug. 1, 1940
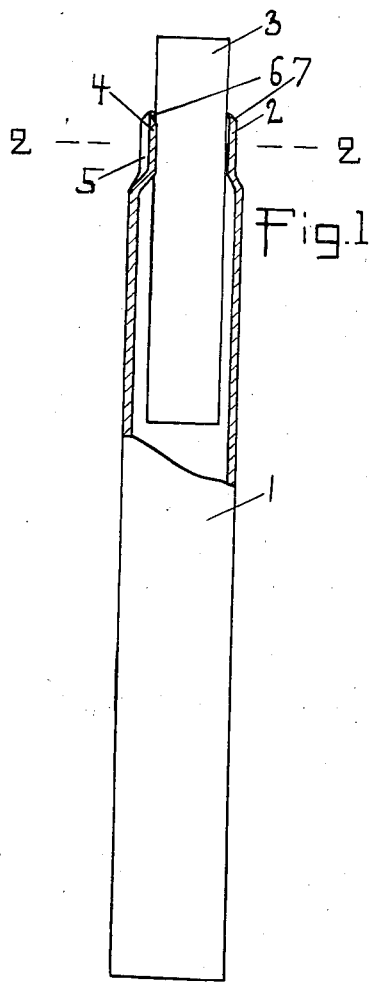
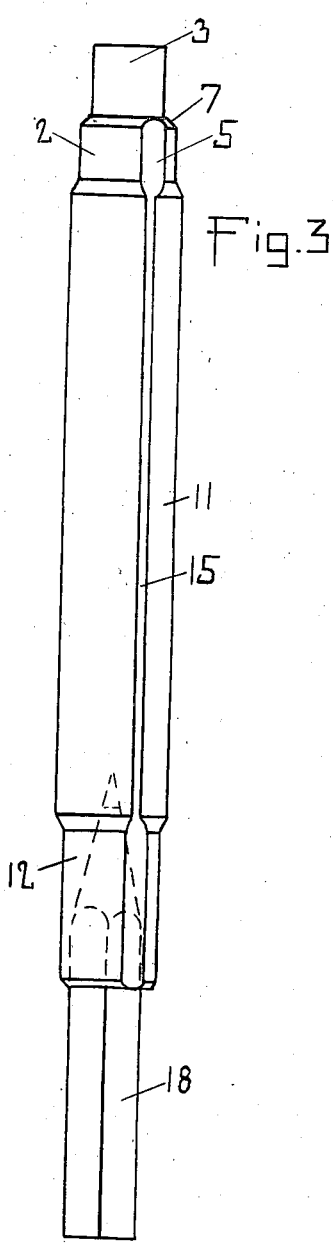
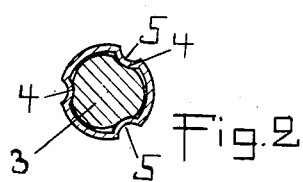
INVENTOR:
HANS JAKOB GERSTER
BY Harry Ernest Rubens
ATTORNEY Patented Nov. 11, 1941

2,261,991

UNITED STATES PATENT OFFICE 2,261,991

ERASING DEVICE

Hans Jakob Gerster, Jegenstorf, Switzerland

Application August 1, 1940, Serial No. 349,371

3 Claims. (Cl. 120—36)

My invention relates to erasing tools of the type where an erasing tip of rubber or other suitable material towers above a holder surrounding and holding another portion of the erasing material. Previously, such erasers have been used chiefly in connection with a pencil, the one end of which has been equipped with a metal sleeve gripping a short rubber piece cemented or clamped therein. Such devices are unsatisfactory in that only a small percentage of the rubber can be utilized, the portion fixed in the sleeve being lost, that the useful projecting portion is consumed after short time, and that the rubber easily becomes loose and falls from the sleeve.

The object of my invention is to avoid these drawbacks and to make an erasing device to be used during a long period, utilizing most of the inserted material, and where the rubber is securely held.

Further objects of my invention are to make it possible to insert new erasing material either for renewed supply of the same kind or for changing the kind of the material, to protect the inserted material from outer influences, for example from becoming dirty or wet, and to make it possible to make the projecting tip always as long as best fit for erasing. Additional objects of my invention are to provide a handy and reliable connection with a pencil or a similar implement, to protect the tip of this implement, and to provide a suitable handle for both the erasing and the writing implements. Still further objects of my invention are to make the device simple, small, light, inexpensive, and durable.

My invention consists of a holder forming a tube in full extent or at least at one end of the holder, and a longish piece of elastic erasing material, preferably rubber, inserted in the tubular end of the holder and slidable therein in longitudinal direction. This piece is considerably longer than the previously used fixed rubber tips to provide enough material after consumption of the projecting rubber tip for adjusting new projecting tips by step by step movement of the piece along the wall of the tube. This movement is effected by small pushing or pulling force overcoming the friction between the piece and the touching surface of the tube. The inner surface of the tube and the thickness of the piece with respect to the tube and the elasticity of the tube and of the piece are made in a way to cause a light pressure between the tube and the inserted piece effecting a slight distortion of the inserted portion of the piece and sufficient to secure the piece against rotation and movement by the erasing pressure, but effecting only a slight friction easily to be overcome for movement in longitudinal direction by application of a small force.

I accomplish the mentioned and other objects and obtain new results as will be apparent from the device described in the following description, particularly pointed out in the attached claims, and illustrated in the accompanying drawing, in which:

Fig. 1 is a side-view, partly sectional, of an embodiment of my invention.

Fig. 2 is a cross-section along the line 2—2 of Fig. 1.

Fig. 3 is a side-view of another embodiment of my invention.

Referring to the drawing, numeral 1 is a tubular holder of thin walled metal, preferably a suitable aluminum alloy. The end portion 2 of it is narrower than the adjacent portion of the tube and rather short to secure an unvariable friction between its inner surface and the inserted piece 3 whatever the actual longitudinal position of this piece may be. The tubular end portion 2 has three inwardly directed longitudinal projections 4 formed by impressing grooves 5 into the tube. The projections 4 are tapered at their ends 6 to form an enlarged opening for introduction of piece 3. The outside of the tubular end may be tapered at edge 7.

The inner surface of the tubular end touching the piece 3 are smooth and may be covered by a glass-hard layer, or the entire surface may be executed in this way.

The piece 3 of elastic erasing material has a length sufficient for a tip portion towering above the holder for work, for an additional portion within the narrow end 2 and for another additional portion within the wider portion of the holder, the latter portion of the piece being originally considerably longer than the towering tip portion and shortened step by step according to the consumption of the tip by moving the piece outwardly. The piece 3 has originally a uniform cross-section, preferably circular, and a thickness slightly greater than the smallest diameter of the opening of the tubular end 2 of the holder. Thus, the piece is slightly distorted by insertion, slightly pressed by the projections 4 determining the smallest diameter of the opening, while there may be other side lines of the tubular end 2 which are not touched by the piece. The distortion secures the piece against rotation relative to the holder. The elasticity of the holder promoted by the grooves 5 and of the elastic piece 3 and the difference of their diameters are gauged to effect a slight pressure and consequent slight friction holding the piece against movement by erasing pressure and enabling longitudinal movement of the piece along the wall of the tube in longitudinal direction by application of a small force.

Referring particularly to the embodiment shown in Fig. 3, numeral 11 is a holder, the upper end of which equals the upper end in Fig. 1, including the inserted piece 3. The lower end 12 has the same cross-section as the upper end 2, but is somewhat longer. The end 12 is adapted to grip a pencil 18. If the pencil is inserted with its point inwardly directed, the holder acts as a protector. If the pencil is inserted the other way, the holder acts as an elongation and makes it possible to utilize the pencil almost until full consumption. The resiliency of the tube enables both clamping and detaching the pencil.

The central portion of the holder may be equipped with grooves 15 preventing the tool from rolling on the desk and bettering the handling. These grooves may be continuations of the end grooves 5 and somewhat less deep than those.

I desire it understood that my invention is not confined to the particular forms shown and described, the same being merely illustrative, and that the invention may be carried out in other ways without departing from the spirit of my invention.

I claim:

1. Erasing device comprising a hollow holder having a tubular end narrower than the main portion of said holder and an offset shoulder around the periphery between said main portion and said end, said end having at least one inwardly directed longitudinal projection; and a longish piece of elastic erasing material slidable within said end and touching said projection, the touching inner lines of said end being slightly less distant than the original thickness of said piece for holding said piece against movement by erasing pressure and enabling movement of said piece in longitudinal direction along the wall of said end by application of a small force.

2. Erasing device comprising a hollow holder having a tubular end narrower than the main portion of said holder and an offset shoulder around the periphery between said main portion and said end, said holder being a thin walled metal tube with at least one impressed longitudinal groove forming an inwardly directed projection throughout the length of said holder and, thus, adapted to apply a resilient pressure on an inserted piece throughout its length.

3. Erasing device comprising a hollow holder having a tubular end narrower than the main portion of said holder and an offset shoulder around the periphery between said main portion and said end; and a longish piece of elastic erasing material slidable within said end and touching the inner surface thereof, the touching parts of the inner surface of said end being slightly less distant than the original thickness of said piece and being covered by a glass-hard layer.

HANS JAKOB GERSTER.